Patented Feb. 15, 1927.

1,617,754

UNITED STATES PATENT OFFICE.

DANIEL GARDNER, OF WEYBRIDGE, ENGLAND.

MANUFACTURE OF PAINTS.

No Drawing. Application filed August 21, 1922, Serial No. 583,379, and in Great Britain October 11, 1921.

This invention relates to an improved method of manufacturing high grade paints, varnishes and enamels of the class in which an oxide such as that of titanium or zirconium is introduced.

The introduction of such oxides gives the paint a high covering power, and different shades of colours can be produced by the addition of oxides of tungsten, vanadium, columbium, tantalum, thorium, uranium, molybdenum or cerium, to the above mentioned oxides or in other combinations. The use of these oxides to the best advantage depends upon the preliminary treatment and further depends upon the presence of certain definite ingredients as fillers which are added to the base, the materials preferably being calcined together, prior to the introduction of the solvents, oils and driers. The invention also comprises a process as set forth, characterized by mixing the chosen oxide with a filler consisting of an oxide or salt of a metal belonging to the same group of the periodic system, heated up to a pressure of 5 to 10 atmospheres in an autoclave with an oil, and only thereafter mixing the resulting product with other ingredients in the uncalcined state at a temperature not exceeding 140° C., but preferably near that temperature.

The present invention consists in the improved process for manufacturing paints, varnishes, enamels and japans of white or other color (referred to in the claims as coating composition) as hereinafter described and defined in the claims.

In carrying the invention into effect it is necessary to note that the quality of the product depends chiefly on two main points: (1) the preliminary treatment which the oxides have undergone before the production of the paints, varnishes, enamels, etc.; (2) the presence of certain definite ingredients as fillers which are to be introduced before the solvents, oils and driers are added to the oxide base, these fillers being preferably calcined with the oxide before incorporating with the vehicle.

The preliminary treatment which the oxides receive depends upon whether the oxide has been produced cold or by the use of heat. If the oxide has been produced cold, say by the precipitation of hydroxide from the respective salt or electrolytically at about room temperature, and then eliminating the bulk of the moisture at a temperature not exceeding 120° centigrade and crushing the oxide, it may be used for paint, after proper sieving, by mixing, at a temperature not exceeding 140° centigrade, direct with the necessary solvents, oils and driers, required to give the paint a proper body.

It may here be mentioned that in such cases when a chlorinated hydrocarbon, aromatic hydrocarbons and high class oils are introduced into the paint special care has to be taken to ensure the absence of moisture as the latter has undesirable effects upon the properties of the paint and may even render it completely useless. If the oxide has been obtained at a high temperature, better results are procurable if the preliminary treatment is effected by heating this oxide with an oil or other vehicle or solvent, for instance, by heating the mixture of oxide and oil or solvent in an autoclave at several atmospheres pressure.

The following examples may best explain these points:—

(a) Titanium hydroxide, $Ti(OH)_4.nH_2O$ obtained by precipitation from aqueous solutions of the tetravalent salts, is filtered and then carefully dried at a temperature of 120° centigrade to eliminate the bulk of moisture. A white substance is obtained which gives a very high grade rust-preventing paint of high covering power.

If titanium oxide is heated to high temperatures say over 800° centigrade, it at once darkens in colour, probably owing to reduction or nitride formation. This may be prevented if ammonium nitrate be present as shown by Pfordten, but the oxide thus obtained gives inferior results with fillers, and the paint does not work well under the brush.

For some purposes, such for example as the production of a paint to withstand heat and moisture, it is desirable to treat this oxide with an oil, say linseed oil, maize oil, castor oil, or menhaden oil in an autoclave, preferably supplied with a stirrer and under a pressure not exceeding 5 to 8 atmospheres.

(b) Zirconium hydroxide $Zr(OH)_4$ obtained by precipitation as a gelatinous substance with ammonium hydroxide or an alkaline hydroxide from aqueous solution or solutions of zirconium salts, is carefully dried at a temperature of 100° centigrade to eliminate the bulk of the moisture. The temperature is gradually raised up to say 125° centigrade, the resulting oxide is powdered, sieved through fine mesh, and then calcined for the production of paint characterized by its high covering power, and its non-poisonous, weatherproof, acid- and alkali-proof properties, and also heat-resisting properties if the correct solvents be employed. Great care is taken so as to remove impurities in the oxide before using it.

If zirconium oxide is treated at say 5 atmospheres pressure with boiled linseed oil in an autoclave a good product results.

Similar results are obtained by using the oxides of cerium, tungsten, vanadium, uranium, niobium, tantalum, thorium and molybdenum, especially the latter, which on heating energetically changes colour.

In some cases it is of great importance to examine from which salt the oxide has been derived. For instance, if thorium oxide is obtained by heating the sulphate it is dense, whereas if thorium nitrate is used, the oxide obtained is flocky and very voluminous. It is obvious that these different oxides give different results when used for the production of paints.

An excellent white paint with good body and covering power is obtained when a mixture of zirconia and thorium oxide (from sulphate) is used in presence of silica or a silicate. The presence of yttria does not seem to affect the result if a paint is to be produced, but is of good service for producing enamels, owing to its surface hardening qualities.

With regard to the presence of certain definite ingredients which play the role of fillers, and which are introduced before the solvents, oils and driers are added, it is to be pointed out that these have an important effect on the oxide used as the base of the paint.

If the oxides of titanium, zirconium, tin, cerium, lead or thorium be used as the base of the paint, and a small amount of special graphite (such as the grade A. F. 1 Acheson graphite or silicide of carbon or substances of a similar nature or fine silica) be added, the adhesive qualities and durability of the paint are considerably improved. The use of graphite for white paints is, however, undesirable, as it darkens the paint.

It is important to note that the addition of a small amount of zirconium or titanium oxide to a lead paint improves the latter if added as silicates, as the paint does not darken or deteriorate on exposure, the silicates referred to (either with or without silica) being the only filler present.

The oxides of vanadium, columbium and tantalum give better results for manufacturing paints, if certain amounts of oxide of antimony are introduced as a filler. When dealing however with light colored paints it is very important to remember that the presence of antimony oxide can affect the colour, and in some cases give dark shades, being affected, for instance, by sulphuretted hydrogen. The presence of small amounts of the respective phosphate greatly improves the paint, at it not only prevents the paint darkening but also gives the surface a good lustre and improves the drying properties.

The covering capacity of chromium, tungsten and uranium oxides used as the base of the paint is especially improved by adding some molybdenum oxide or salt as filler.

These remarks show that a considerable improvement of the paint is reached by introducing as filler an oxide (or salt) of a metal belonging to the same group of the periodic system of elements as the base.

One feature, however, all such paints, varnishes, enamels, japans and the like require, is that the oxides and all other ingredients must be completely free from moisture if a high quality product is to be produced. In making titanium oxid and other paints of more or less similar qualities, it has heretofore been proposed to add, calcium sulfate, barium sulfate and the like, either before the precipitation of the titanium compound or later. However I prefer not to employ any sulfates of the alkaline earth metals as extenders, as the wearing properties of the paint would suffer by such addition.

I claim:

1. A process of making liquid coating composition containing as pigments, solid insoluble permanent oxide compounds of metal of the fourth to sixth groups of the periodic system, said pigments comprising a base and a filler, said base and filler components in said pigments being both compounds of metals of the same group, in which process the impurities are first removed from the oxide and moisture is eliminated therefrom by calcining, mixing the base and filler constituents to form a pigment, and crushing and passing said pigment through a sieve into a mill, during the gradual addition to said pigment of the remaining ingredients of said liquid coating composition.

2. A process of making a liquid coating composition as covered in claim 1, in which the impurities are first removed from the oxide and moisture is eliminated therefrom by calcining, mixing the base and filler to form a pigment, and crushing and passing said pigment through a sieve into a mill while still hot, and during the gradual addition to the pigment of the remaining ingredients of the liquid coating composition.

3. In the production of liquid coating compositions of the character specified in claim 1, the step of mixing the pigment, freed from moisture, with the liquid portions of the coating composition, such mixing being effected while the pigment is still hot.

4. In the process of making a coating composition the improvement which comprises drying a solid oxide compound of a metal of the fourth to, sixth groups of the periodic system, which compound upon calcination leaves an insolubel permanent compound of said metal, such drying being sufficient to remove free water and water of composition but being not substantially above 125° C., then incorporating with a solid stable non-volatile insoluble metal compound of the same group as said metal, and calcining the mixture, then mixing the calcined solids in a finely divided state with a paint vehicle and heating the vehicle and pigment to about 140° C., during some part of the process.

5. In the process of making a coating composition the improvement which comprises drying an oxide compound of a metal of the fourth to sixth groups of the periodic system, such drying being sufficient to remove free water and water of composition but being not substantially above 125° C., then incorporating with a solid stable non-volatile oxide compound of an element of the same group as said metal, which substance is capable of increasing the covering capacity of the said oxid compound, then mixing the solids in a finely divided state with a paint vehicle.

6. In the process of making a coating composition the improvement which comprises drying a solid pigmenting oxid compound of a metal of the fourth to sixth groups of the periodic system, such drying being sufficient to remove free water and water of composition but being not substantially above 125° C., thereafter calcining, drying and mixing with a vehicle.

7. In the process of making a coating composition the improvement which comprises drying a solid pigmenting oxid compound of a metal of the fourth group of the periodic system, such drying being sufficient to remove free water and water of composition but being not substantially above 125° C., then incorporating with a solid stable non-volatile silicon compound.

8. A process of making a coating composition which comprises first removing the impurities from solid pigmenting oxides of metals of the fourth to sixth groups of the periodic system, which are to be used in the paint, eliminating moisture from these oxids, mixing the oxids with a filler material to form a pigment, drying the pigment, crushing it to the state of fineness necessary for a pigment, and gradually adding the mixed pigment to a vehicle.

9. In the process of claim 8, the step of conducting the grinding operation while the material is still hot.

10. In the process of making paints as covered in claim 8, the step of grinding the pigment and adding the same to the vehicle, while the pigment is still hot.

11. In the process of making coating compositions, the herein described improvement of eliminating the moisture which comprises heating the pigment material to a temperature not exceeding 125° C., and mixing the pigment with a paint vehicle, and maintaining the mixture at a temperature of 140° C., whereby water is completely eliminated.

12. In the process of claim 11, the improvement which comprises heating the pigment and oil in an autoclave under a pressure of 5 to 10 atmospheres.

DANIEL GARDNER.